United States Patent [19]

Ishikawa

[11] Patent Number: 4,901,603
[45] Date of Patent: Feb. 20, 1990

[54] CONTROL APPARATUS FOR HYDRAULICALLY OPERATED VEHICULAR TRANSMISSIONS

[75] Inventor: Keiichi Ishikawa, Utsunomiya, Japan
[73] Assignee: Honda Giken Kogyo Kabushiki Kaisha, Tokyo, Japan
[21] Appl. No.: 146,078
[22] Filed: Jan. 20, 1988
[30] Foreign Application Priority Data
  Jan. 20, 1987 [JP] Japan .................................. 62-9064
[51] Int. Cl.$^4$ ............................................. B60K 41/10
[52] U.S. Cl. .......................................... 74/866; 74/869
[58] Field of Search ................................. 74/869, 866
[56] References Cited

U.S. PATENT DOCUMENTS

| 3,943,799 | 3/1976 | Sakai et al. ............... 74/869 X |
| 4,346,627 | 8/1982 | Kawamoto .................. 74/869 |
| 4,485,695 | 12/1984 | Kawamoto .................. 74/869 |
| 4,501,175 | 2/1985 | Tatsumi ..................... 74/869 |
| 4,558,612 | 12/1985 | Shimizu et al. .............. 74/869 X |

FOREIGN PATENT DOCUMENTS

| 3500329 | 8/1985 | Fed. Rep. of Germany . |
| 59-166750 | 9/1984 | Japan . |
| 61-82051 | 4/1986 | Japan . |
| 61-84450 | 4/1986 | Japan . |
| 61-127956 | 6/1986 | Japan . |
| 0041451 | 2/1987 | Japan ..................... 74/869 |
| 0233548 | 10/1987 | Japan ..................... 74/869 |
| 88/00302 | 1/1988 | PCT Int'l Appl. .......... 74/869 |

Primary Examiner—Dwight G. Diehl
Assistant Examiner—Harold F. Macris
Attorney, Agent, or Firm—Armstrong, Nikaido, Marmelstein, Kubovcik & Murray

[57] ABSTRACT

Apparatus for controlling at least three shift valves operating four hydraulic clutches in a hydraulically operated vehicular transmission. The shift valves are serially located and alternately switched to establish successive first through fourth-speed transmission trains. Each shift valve is urged to one position by a respective spring and has an oil chamber at its opposite for oil pressure to urge it to its other position. Additionally, the first shift valve has another oil chamber at its spring end. A first electromagnetic open-air pressure dump valve is connected to a first oil passage through which oil is inputted to the first oil chamber of the first shift valves and the oil chamber of the second shift valve. A second electromagnetic open-air pressure dump valve is connected to a second oil passage through which oil is inputted to the other oil chamber of the first shift valve and the oil chamber of the third shift valve. An electronic microcomputer controls the first and second electromagnetic valves to operate the shift valves by permitting or dumping oil pressure to the oil chambers.

8 Claims, 6 Drawing Sheets

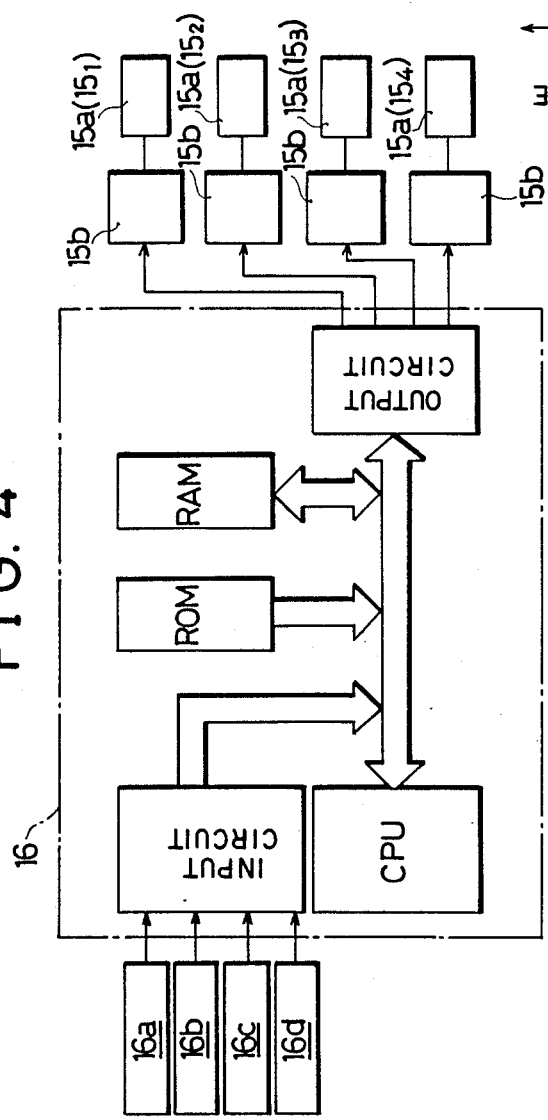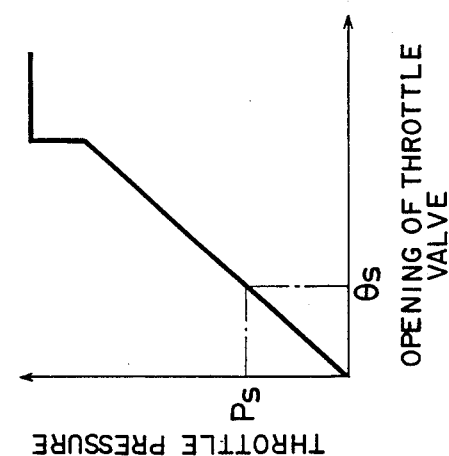

CONTROL APPARATUS FOR HYDRAULICALLY OPERATED VEHICULAR TRANSMISSIONS

BACKGROUND OF THE INVENTION

This invention relates to a control apparatus for a hydraulically operated vehicular transmission comprising first to fourth forward speed transmission trains which are so arranged as to be established by the engagement of first- to fourth-speed hydraulic clutches.

There is a known control apparatus of this kind as disclosed in Japanese Patent Laid-open No. 84450/1986. This known apparatus includes a hydraulic circuit for controlling the supplying and discharging of oil to and from first- to fourth-speed hydraulic clutches. The hydraulic circuit is provided with a first shift valve connected to a hydraulic power source via a manual valve, a second shift valve located on the downstream side of the first shift valve, and a third shift valve located on the downstream side of the second shift valve. The first shift valve is constructed to be switchable to a first speed position at which the supplying of the oil to the first speed hydraulic clutch and the discharging of the oil from the second speed hydraulic clutch are carried out and to a second speed position at which the supplying of the oil to the second shift valve is carried out. The second shift valve is constructed to be switchable to a second speed position at which the supplying of the oil, which is supplied from the first shift valve, to the second speed hydraulic clutch and the discharging of the oil from the third speed hydraulic clutch end carried out and to a third-speed position at which the discharging of the oil from the second-speed hydraulic clutch and the supplying of the oil to the third shift valve are carried out. The third shift valve is constructed to be switchable to a third-speed position at which the supplying of the oil, which is supplied from the second shift valve, to the third speed hydraulic clutch and the discharging of the oil from the fourth speed hydraulic clutch are carried out and to a fourth speed position at which the discharging of the oil from the third speed hydraulic clutch and the supplying of the oil to the fourth-speed clutch are carried out. In this manner, there can be obtained first-speed travelling with the first shift valve set to the first-speed position, second speed travelling with the first and second shift valves set to the second speed positions, third-speed travelling with the second and third shift valves set to the third speed positions while leaving the first shift valve set to the second speed position, and fourth speed travelling with the third shift valve alone switched over to the fourth speed position while leaving the first and second shift valves as they are during third-speed travelling. A throttle pressure according to the degree of opening of a throttle valve in the engine and a governor pressure according to the vehicle speed can be applied to each shift valve in the direction opposite to each other to carry out the switching of these shift valves in accordance with the travelling condition.

The number of control apparatuses using an electronic control circuit to switch and control the shift valves has been increasing lately because such a control circuit enables a finer speed change control operation to be carried out and because the speed change characteristics can be changed easily in accordance with the type of vehicle.

In such a case, one possibility is to arrange the apparatus such that there are provided four shift valves in total, one for each hydraulic clutch, and disposed in parallel with one another with respect to the hydraulic power source. Electromagnetic valves could be connected respectively to the shift valve switching pilot oil passages, these electromagnetic valves being opened and closed by the electronic control circuit so as to carry out switching over of the shift valves. However, this would require an increased number of the valves, and makes it necessary to carry out switching of the shift valve for the engaged hydraulic clutch to the oil supplying position and the switching of the shift valve for the disengaged hydraulic clutch to the oil discharging position simultaneously. Consequently, the control operation would become complicated.

Compared with the above possible arrangement, a control apparatus according to the prior art discussed in the foregoing is more advantageous in that it needs only three shift valves and in that, by having the second shift valve set to the second speed position when in first speed travelling, and the third shift valve set to the third speed position when in second speed travelling, any speed change can be carried out by switching only one shift valve at a time.

In this case, it is possible to arrange the apparatus such that the first to third shift valves may be controlled for switchover by means of electromagnetic valves corresponding thereto which are adapted to be opened and closed by an electronic control circuit. However, in order to further reduce the number of parts, it is also desired that the number of these electromagnetic valves be reduced.

OBJECTS AND SUMMARY OF THE INVENTION

It is an object of the present invention to provide a control apparatus for vehicular transmissions, in which control operation for switching over of the first to third shift valves discussed in the above-described conventional control apparatus can be made by means of only two electromagnetic valves, thus meeting such requirements as mentioned in the foregoing.

To achieve this object, the present invention provides a control apparatus for hydraulically operated vehicular transmission comprising first- to fourth-speed hydraulic clutches which respectively establish first- to fourth-speed transmission trains for forward drive, which apparatus includes a hydraulic circuit through which oil is fed to said clutches and discharged from said clutches and which is provided with a first shift valve connected through a manual valve to a hydraulic power source, a second shift valve located downstream of the first shift valve and a third shift valve located downstream of the second shift valve. The first shift valve is switchable to first-speed position at which the supplying of the oil to the first-speed hydraulic clutch and the discharging of the oil from the second-speed hydraulic clutch are carried out and to second-speed position at which the oil feeding to the second shift valve is carried out. The second shift valve is switchable to second-speed position at which the feeding to the second-speed hydraulic clutch of the pressure oil supplied from said first shift valve and the discharging of the oil from the third-speed hydraulic clutch are carried out and to third-speed position at which the discharging of oil from the second hydraulic clutch and the feeding of the oil to the third shift valve are carried out. The third shift valve is switchable to third-speed position at which the supplying to the third-speed hydraulic clutch of the pressure oil supplied from said second shift valve and the discharging of the oil from the fourth-speed hydraulic clutch are carried out and to fourth-speed position at which the discharging of the oil from the third-speed hydraulic clutch and the feeding of the oil to the fourth-speed hydraulic clutch are carried out. The invention is characterized in that the first shift valve is urged to the second-speed position, the second shift valve to the second-speed position and the third shift valve to the third-speed position by respective springs, and in that there are provided a first oil chamber giving the first shift valve a pressing force acting towards the second-speed position, a second oil chamber giving the first shift valve a pressing force acting towards the first-speed position, a third oil chamber giving the second shift valve a pressing force acting towards the third-speed position, and a fourth oil chamber giving the third shift valve a pressing force acting towards the fourth-speed position. There are further provided a first electromagnetic open-air valve connected to a first oil passage through which the pressure oil is inputted to the first and the third oil chambers, and a second electromagnetic open-air valve connected to a second oil passage through which the pressure oil is inputted to the second and the fourth oil chambers.

The operation of the present invention will now be described with reference to FIG. 9 which shows the concept of the present invention.

When the first open-air valve is opened with the second open-air valve closed, the first oil passage is opened to the atmospheric air, to cause the inputting of the hydraulic pressure into the first oil chamber, which is adapted to press the first shift valve to the second speed position, and into the third oil chamber, which is adapted to press the second shift valve to the third speed position, to be discontinued. The hydraulic pressure is inputted into the second oil chamber, which is adapted to press the first shift valve toward the first-speed position, and into the fourth oil chamber, which is adapted to press the third shift valve toward the fourth speed position, through the second oil passage. Consequently, the first shift valve is switched over to the first speed position against the relative spring and the third shift valve to the fourth speed position against the relative spring while the second shift valve is retained in the second speed position owing to the resilient force of the relative spring applied thereto. Under this condition, the oil is fed only to the first speed hydraulic clutch, so that the first-speed transmission train is established.

When both the first and second open-air valves are opened, the second oil passage is opened to the atmospheric air, and the inputting of the hydraulic pressure into the second and fourth oil chambers through this oil passage is discontinued, so that the first and third shift valves are switched over to the second speed position and third speed position, respectively, owing to the resilient force of the relative springs applied thereto while the second shift valve is retained in the second speed position in the same manner as mentioned in the foregoing. Consequently, the oil from the hydraulic power source is supplied to the second shift valve through the first shift valve and to the second speed hydraulic clutch from the second shift valve, whereby the second speed transmission train is established.

When the first open-air valve is closed with the second open-air valve opened, the second shift valve is switched over to the third speed position against the relative spring owing to the hydraulic pressure inputted into the third oil chamber through the first oil passage, and the first and the third shift valves are retained in the second and the third speed positions in the same manner as mentioned above, so that the oil from the hydraulic power source is supplied to the third shift valve through the first and second shift valves and then supplied from the third shift valve to the third speed hydraulic clutch, this establishing the third speed transmission train.

When both the first and second open-air valves are closed, the third shift valve is switched over to the fourth speed position against the relative spring owing to the hydraulic pressure inputted into the fourth oil chamber through the second oil passage, in which case a pressing force toward the first speed position is applied to the first shift valve owing to the hydraulic pressure inputted into the second oil chamber through the second oil passage. However, this pressing force is offset by the pressing force inputted from the first oil passage into the first oil chamber. Therefore, the first shift valve is retained in the second position owing to the resilient force of the relative spring applied thereto, and the second shift valve also retained in the third speed position in the same manner as mentioned above, so that the supplying of the oil to the third shift valve through the first and the second shift valve is continuously carried out. With the third shift valve switched to the fourth speed position, the oil is supplied to the fourth speed hydraulic clutch, thereby establishing the fourth speed transmission train. The above operations are summarized in the following table.

| Speed | First Open-air valve | Second Open-air valve | First shift valve | Second shift valve | Third shift valve |
| --- | --- | --- | --- | --- | --- |
| First speed | Opened | Closed | First speed position | Second speed position | Fourth speed position |
| Second speed | Opened | Opened | Second speed position | Second speed position | Third speed position |
| Third speed | Closed | Opened | Second speed position | Third speed position | Third speed position |
| Fourth speed | Closed | Closed | Second speed position | Third speed position | Fourth speed position |

At the first speed, the oil is discharged from the second speed hydraulic clutch through the first shift valve which is in the first speed position. At the second speed, the oil is discharged from the third speed hydraulic clutch through the second shift valve which is in the second speed position. At third speed, the oil is discharged from the second speed hydraulic clutch through the second shift valve which is in the third speed position, and is discharged from the fourth speed hydraulic clutch through the third speed shift valve which is in the third speed position. At the fourth speed, the oil is discharged from the third speed hydraulic clutch through the third shift valve which is in the fourth speed position.

In the embodiment which will be described hereinbelow, there is interposed in the first-speed transmission train a one-way clutch which allows the over-revolution at the output side so that the oil may be supplied constantly from the upstream side of the first shift valve into the first speed hydraulic clutch. In the case where the one-way clutch is not interposed, the oil is supplied to the first speed hydraulic clutch through the first shift valve which is in the first speed position, and discharged from the same clutch through the first shift valve which is in the second speed position thereof.

In any case, the three shift valves, the first to the third, can be controlled properly by opening and closing the two electromagnetic open-air valves for carrying out the speed changing operations to obtain any of the first to fourth speeds, thus demonstrating that the controlling by an electronic control circuit of the speed changing operations is easily realized.

BRIEF DESCRIPTION OF THE DRAWINGS

FIG. 4 is a block diagram of a circuit for controlling open-air valves;

FIG. 5 is a diagram of the output characteristics of a throttle valve provided in the hydraulic circuit;

DETAILED DESCRIPTION OF A PREFERRED EMBODIMENT

Figure 1:
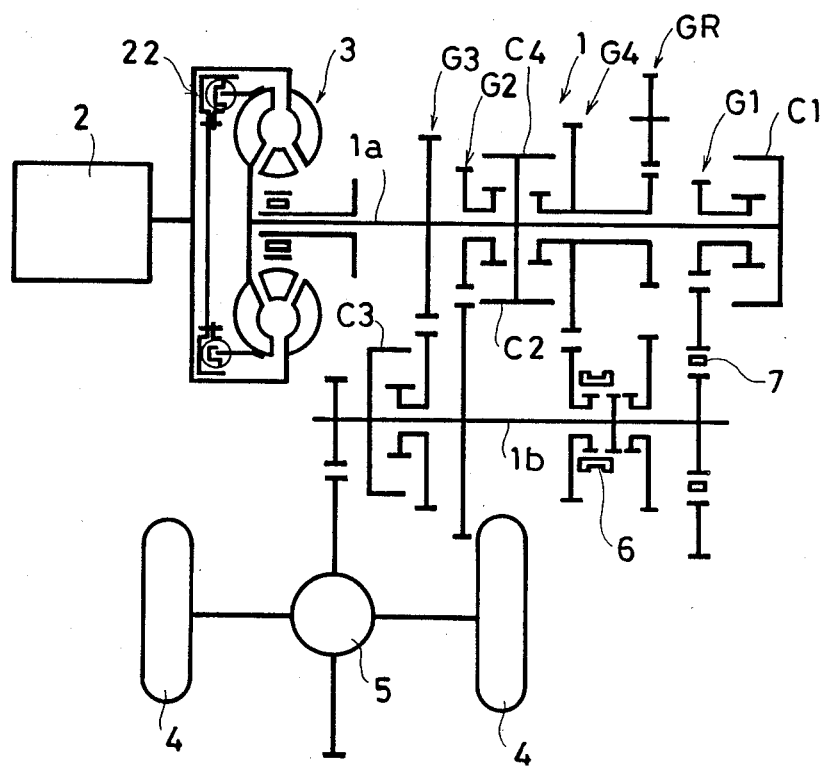
FIG. 1 is a schematic diagram of an example of a transmission to which the present invention is applied.

Referring to FIG. 1, a transmission 1 for carrying out the changing of a vehicle speed to four forward speeds and one reverse speed comprises first to fourth forward speed transmission trains, G1, G2, G3, G4 and a reverse transmission train GR provided between an input shaft $1a$ connected to an engine 2 via a hydraulic torque converter 3 and an output shaft $1b$, connected to the driving wheels 4 of a vehicle via differential gear 5. The forward speed transmission trains G1, G2, G3, G4 have first to fourth speed hydraulic clutches C1, C2, C3, C4, each constituting a hydraulic engaging element and interposed respectively therein, so that the transmission trains G1, G2, G3, G4 may be selectively established by the engagement of the respective hydraulic clutches C1, C2, C3, C4. The reverse transmission train GR and the fourth-speed transmission train G4 commonly use the fourth speed hydraulic clutch G4. These transmission trains G4, GR are established selectively by shifting a selector gear 6, which is mounted on the output shaft $1b$, to a forward position shown on the left-hand side on the drawing, and to a reverse position shown on the right-hand side on the drawing.

A one-way clutch 1 is interposed in the first speed transmission train G1 and adapted to operate so as to allow the over-revolution of the output shaft $1b$.

Figure 2:
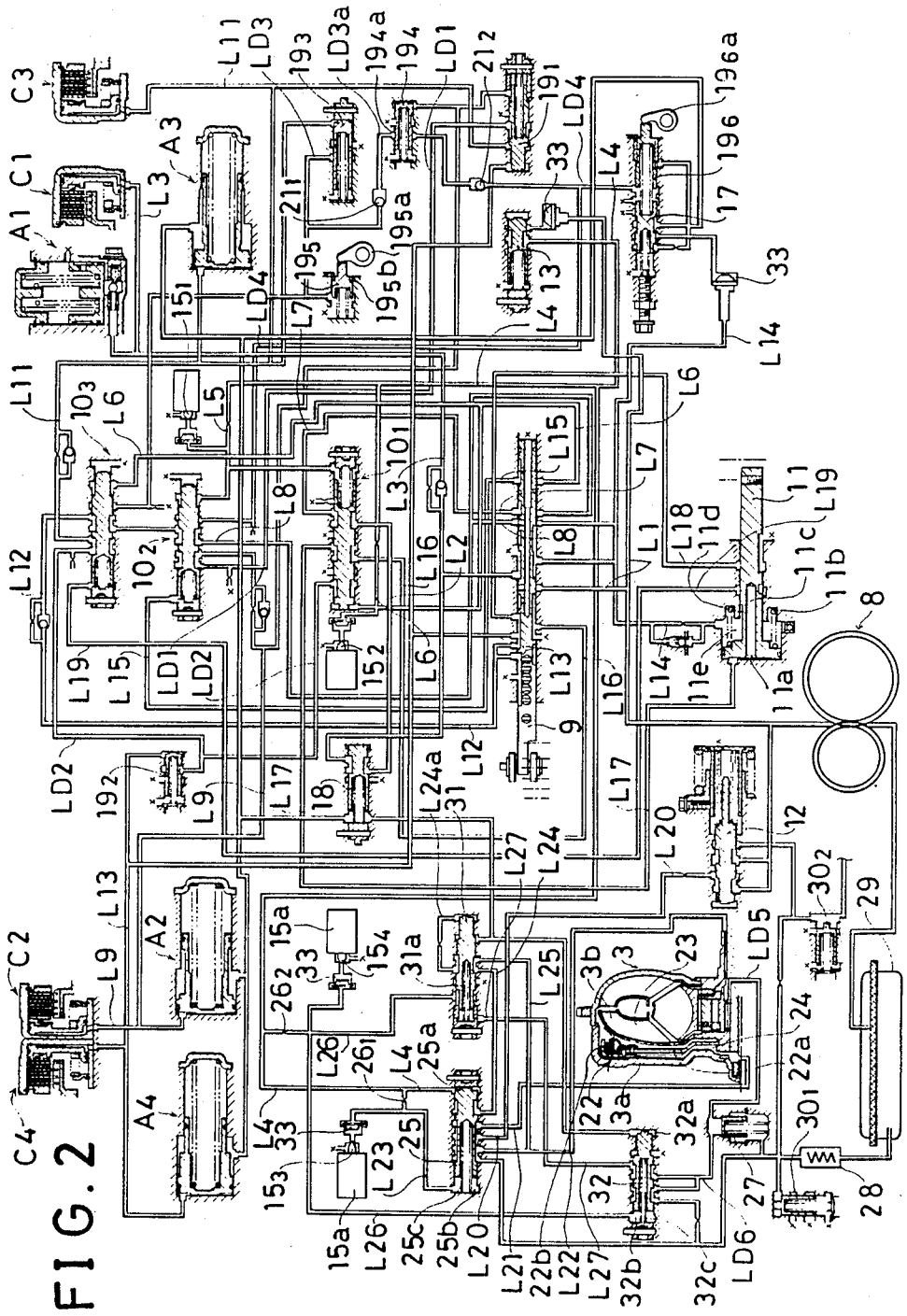
FIG. 2 is a diagram of a hydraulic circuit for the transmission.
Figure 3:
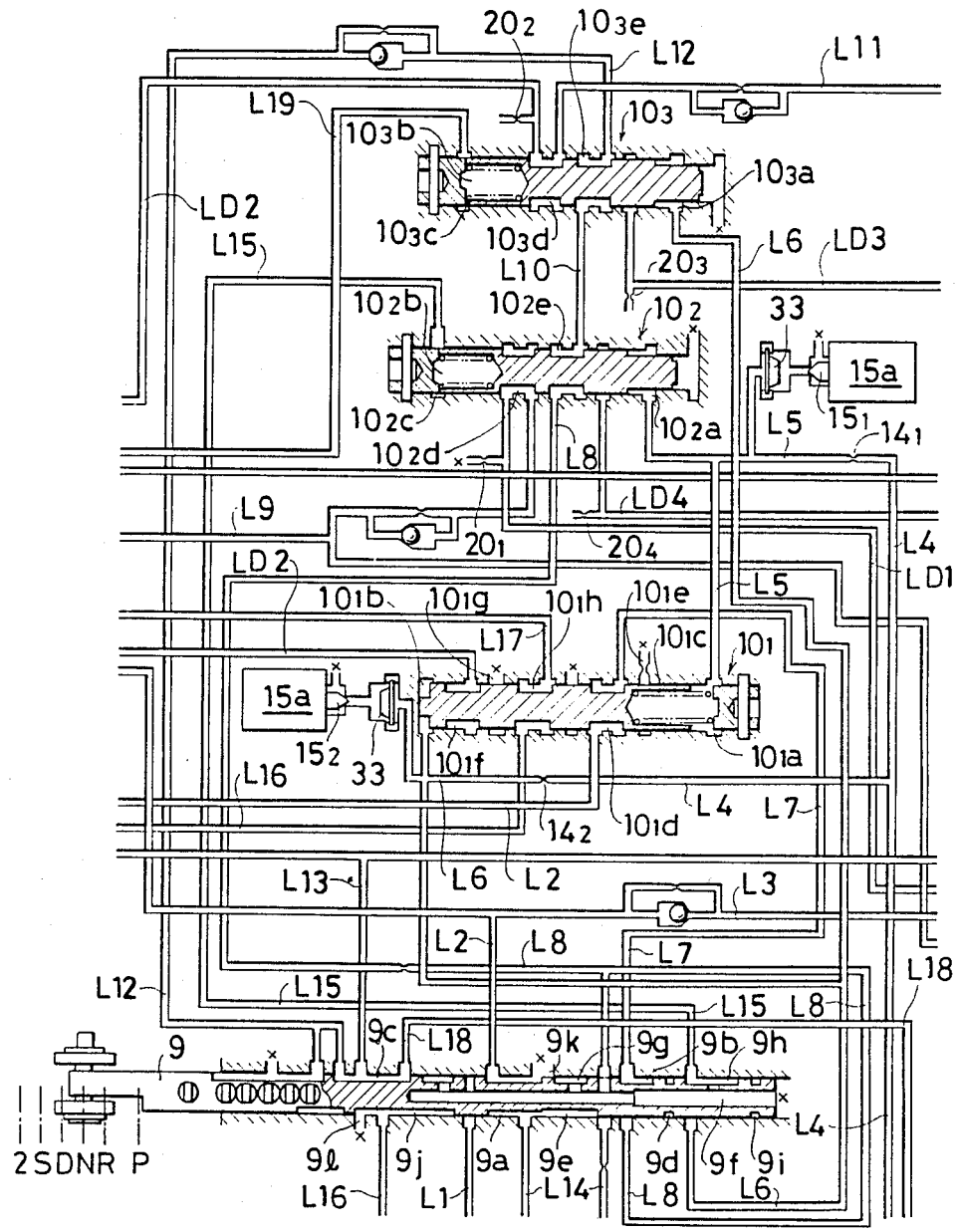
FIG. 3 is an enlarged diagram of a principal portion of the hydraulic circuit.

The supplying and discharging of the oil to and from the hydraulic clutches C1, C2, C3, C4 are controlled by the hydraulic circuit shown in FIG. 2. This will now be described in detail. The hydraulic circuit is provided with a hydraulic power source 8; a manual valve 9 switchable to the six positions clearly shown in FIG. 3, namely a parking position P, a reverse position R, a neutral position N, automatic speed changing positions D and S and a second speed retaining position 2; a first shift valve $10_1$ for switchover between first and second speeds, a second shift valve $10_2$ for switchover between second and third speeds, a third shift valve $10_3$ for switchover between third and fourth speeds, and a servo valve 11 for switchover between forward and reverse drives, with the servo valve being connected to the selector gear 6. With the manual valve 9 set to the D position, No. 1 oil passage L1 communicating with the hydraulic power source 8 is connected via an annular groove $9a$ of the valve 9 to No. 2 oil-passage L2 which communicated with the first shift valve $10_1$, so that pressure oil having the pressure regulated to a predetermined line pressure by a regulator valve 12 is supplied from the No. 1 oil passage L1 to the No. 2 oil passage L2 and, consequently, the supplying of the oil to the first speed hydraulic clutch C1 through No. 3 oil passage L3 which branches off from the No. 2 oil passage L2, and the supplying of the oil to the second to fourth speed hydraulic clutches C2, C3, C4, through the first to third shift valves $10_1$, $10_2$, $10_3$ are carried out.

The first shift valve $10_1$ is formed so as to be switchable to the right-hand first speed position and the left-hand second speed position. The second shift valve $10_2$ is switchable to the right-hand second speed position and the left-hand third speed position. The third shift valve $10_3$ is switchable to the right-hand third speed position and the left-hand fourth speed position. A modulator pressure (a predetermined pressure lower than the line pressure) from a modulator valve 13 connected with the No. 4 oil passage L4 is inputted into the right end oil chambers $10_1a$, $10_2a$ in the first and the second shift valves $10_1$, $10_2$ through No. 5 oil passage L5, which communicates with No. 4 oil passage L4 on the output side of the modulator valve 13 via an orifice $14_1$, and into an left-end oil chamber $10_1b$ in the first shift valve $10_1$ and an right-end oil chamber $10_3a$ in the third shift valve $10_3$ through No. 6 oil passage L6 which communicated with the No. 4 oil passage L4 via another orifice $14_2$. An electromagnetic normally-closed type first open-air valve $15_1$ is connected to the No. 5 oil passage L5, and an electromagnetic normally-closed type second open-air valve $15_2$ to the No. 6 oil passage L6, so that these shift valves $10_1$, $10_2$, $10_3$ may be switched as described in the following according to each selected speed by opening and closing the two open-air valves $15_1$, $15_2$.

At the first speed, the first open-air valve $15_1$ is opened and the second open-air valve $15_2$ is closed. As a result, the inputting of the modulator pressure into the right-end oil chambers $10_1a$, $10_2a$ in the first and second shift valves $10_1$, $10_2$ is discontinued and the modulator pressure is inputted into the left-end oil chamber $10_1b$ in the first shift valve $10_1$ and the right-end oil chamber $10_3a$ in the third shift valve $10_3$. Consequently, the first shift valve $10_1$ is switched to the right-hand first speed position against a right end spring $10_1c$, the second shift valve $10_2$ is switched to the right-hand second speed position by the resilient force of a left-end spring $10_2c$, applied thereto, and the third shift valve $10_3$ is switched to the left-hand fourth speed position against a left end spring $10_3c$. In this condition, the communication between the No. 2 oil passage L2 on the inlet side of the first shift valve $10_1$ and a No. 7 oil passage L7 on the outlet side thereof is discontinued, and the oil is supplied to the first speed hydraulic clutch C1 along through the No. 3 oil passage L3, so that the first speed transmission train G1 is established.

At the second speed, both the first and second open-air valves $15_1$, $15_2$ are opened. As a result, the inputting of the modulator pressure into the left end oil chamber $10_1b$ in the first shift valve $10_1$ and the right end oil chamber $10_3a$ in the third shift valve $10_3$ is discontinued, and the first and third shift valves $10_1$, $10_3$ are switched to the left-hand second speed position and right-hand third speed position, respectively by the resilient force of the springs $10_1c$, $10_3c$ applied thereto while the second shift valve $10_2$ is retained in the second speed position in the same manner as mentioned above. In this condition, the No. 2 oil passage L2 is communicated with the No. 7 oil passage L7 through an annular groove $10_1d$ in the first shift valve $10_1$. The oil is thus supplied to the second speed hydraulic clutch C2 through No. 8 oil passage L8, which is communicated with the No. 7 oil passage L7 via a groove 9b in the manual valve 9 when the valve 9 is in the D position, and through the No. 9 oil passage L9, which is communicated with the No. 8 oil passage L8 via an annular groove $10_2d$ in the second shift valve $10_2$ when the valve $10_2$ is in the second speed position so that the second speed transmission train G2 is established. In this case, the transmission of power via the first speed transmission train G1 is stopped automatically due to the operation of the one-way clutch 7.

At the third speed, the first open-air valve $15_1$ is closed, and the second open-air valve $15_1$ is opened. As a result, the modulator pressure is inputted into the right-end oil chambers $10_1a$, $10_2a$ in the first and second shift valves $10_1$, $10_2$, and the second shift valve $10_2$ is switched over to the lefthand third speed position against the spring $10_2c$ with the first and third shift valves $10_1$, $10_3$ being retained in the second and third speed positions. In this condition, the No. 8 oil passage L8 is communicated with No. 10 oil passage L10, which is communicated with the third shift valve $10_3$ through an annular groove $10_2e$ in the second shift valve $10_2$, and the oil is supplied to the third speed hydraulic clutch C3 through No. 11 oil passage L11, which is connected via an annular groove $10_3d$ in the third shift valve $10_3$ with the No. 10 oil passage L10 when the third shift valve $10_3$ is in the third speed position. Also, the No. 9 oil passage L9 communicating with the second speed hydraulic clutch C2 is communicated with No. 1 discharge oil passage LD1 via the annular groove $10_2d$ in the second shift valve $10_2$, so that the discharging of the oil from the third speed transmission train G3 is established.

At the fourth speed, both the first and second open-air valves $15_1$, $15_2$ are closed. As a result, the first and second shift valves $10_1$, $10_2$ are retained in the second and the third speed positions, respectively, in the same manner as at the third speed, and the third shift valve $10_3$ is switched over to the left-hand fourth speed position by virtue of the modulator pressure inputted into the right-end oil chamber $10_3a$ in the third shift valve $10_3$. As for the first shift valve $10_1$, it is kept retained at the second speed position by the resilient force of the spring $10_1c$, in that the modulator pressure inputted into the oil chambers $10_1a$, $10_1b$ located at both ends thereof makes the left-side and right-side pressing forces resulting from the modulator pressure balanced between each other. In this condition, the No. 10 oil passage L10 is connected with No. 12 oil passage L12 through an annular groove $10_3e$ in the third shift valve $10_3$, and the oil is supplied to the fourth speed hydraulic clutch C4 through No. 13 oil passage L13 which gets connected with the No. 12 oil passage L12 through a groove 9c in the manual valve 9 when the manual valve 9 is in the D position. Also, the No. 11 oil passage L11 communicating with the third speed hydraulic clutch C3 is communicated with a second discharge oil passage LD2 through the annular groove $10_3d$ in the third shift valve $10_3$, so that the discharging of the oil from the third speed hydraulic clutch C3 is carried out, whereby the fourth speed transmission train G4 is established.

When the fourth speed is shifted down to the third speed, the No. 12 oil passage L12 is connected, through the annular groove $10_3e$ in the third shift valve $10_3$ which is in the third speed position, to the No. 3 discharge oil passage LD3 to discharge the oil from the fourth speed hydraulic clutch C4. When the third speed is shifted down to the second speed, the No. 10 oil passage L10 communicated with the No. 11 oil passage L11 through the annular groove $10_3d$ in the third shift valve $10_3$ which is in the third speed position is communicated with No. 4 discharge oil passage LD4 through the annular groove $10_2e$ in the second shift valve $10_2$ which is in the second speed position so as to discharge the oil from the third speed hydraulic clutch C3. When the second speed is shifted down to the first speed, the No. 7 oil passage L7, which is communicated with the second oil passage L2 at the second speed as mentioned above is communicated with an oil discharge port $10_1e$ through the annular groove $10_1d$ in the first shift valve $10_1$ as the operation to switch over the first shift valve $10_1$ to the first speed position is performed, so that the discharging of the oil from the second speed hydraulic clutch C2 is carried out through the No. 9, No. 8 and No. 7 oil passages since the No. 7 oil passage L7 is communicated with the second speed hydraulic clutch C2 through the No. 8 and No. 9 oil passages L8, L9 in the same manner as at the second speed.

Figure 6:
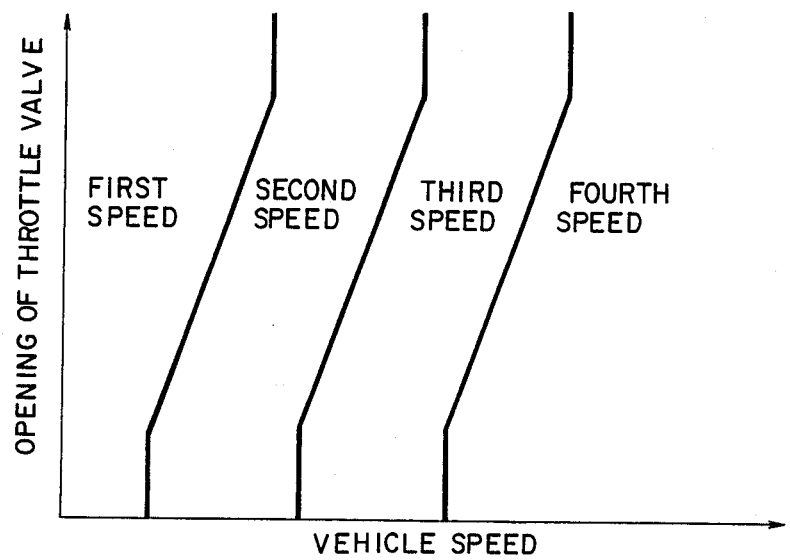
FIG. 6 is a diagram of the speed change characteristics in a D position in a manual valve.

As described above, with the manual valve 9 in the D position, the first to fourth speed transmission trains are selectively established by opening and closing the first and second open air valves $15_1$, $15_2$, and a signal from an engine's throttle valve opening sensor 16a (or a signal representative of the negative pressure in the intake passage relative to the engine load may also be used), a signal from a vehicle speed sensor 16b and a signal from a position sensor 16c for the manual valve 9 are inputted into an electronic control circuit consisting of a microcomputer as shown in FIG. 4, so that the opening and closing of the open-air valves $15_1$, $15_2$ are controlled by the control circuit 16 in such a way that the speed change characteristics shown in, for example, FIG. 6 can be obtained.

Referring to the drawings, reference symbols A1, A2, A3, A4 denote accumulators provided so as to lessen a sudden pressure variation during the supplying and discharging of the oil to and from the hydraulic clutches C1, C2, C3, C4. Reference numeral 17 denotes a throttle valve adapted to regulate a line pressure, which is inputted from No. 14 oil passage L14 communicating with the No. 1 oil passage L1 through the manual valve 9, to such a throttle pressure as shown in FIG. 5 according to the degree of opening of the throttle valve, and then output the resultant line pressure. The throttle pressure from the throttle valve 17 is applied as a back pressure to the second to fourth speed accumulators A2, A3, A4. A reducing valve 18 adapted to be pressed toward the right-hand opening side by the throttle pressure is interposed in the second oil passage L2 so as to reduce the pressure, which is supplied to the downstream side of the No. 2 oil passage L2, in the region of a low degree of opening of the throttle. This reducing valve 18 is known from Japanese Patent Laid-open No. 166750/1984, and a detailed description thereof will be omitted herein.

The discharge oil passages LD1, LD2, LD3, LD4 are provided therein with the discharge oil control valves $19_1$, $19_2$, $19_3$, $19_4$ and orifices $20_1$, $20_2$, $20_3$, $20_4$ which are disposed in parallel with the valves $19_1$–$19_4$, so that the resistances in the discharge oil passages LD1, LD2, LD3, LD4 can be increased and decreased by closing and opening the control valves $19_1$, $19_2$, $19_3$, $19_4$.

This will now be described more in detail. The second discharge oil control valve $19_2$, which is interposed in the second discharge oil passage LD2 connected to the third speed hydraulic clutch C3 when the third speed is shifted up to the fourth speed is pressed toward the left-hand opening side by the hydraulic pressure (which will hereinafter be referred to as fourth speed pressure) from the fourth speed hydraulic clutch C4 on the engaged side. When he third speed is shifted up to the fourth speed, the fourth speed pressure increases to a predetermined level to open the control valve $19_2$, so that there can be caused a difference in sharpness of the pressure dropping characteristic of the hydraulic pressure (which will hereinafter be referred to as third speed pressure) in the third speed hydraulic clutch C3 on the disengaged side between before and after opening of the valve $19_2$. Thus, the time for disengaging the third speed hydraulic clutch C3 is properly controlled, so that the speed change can be carried out smoothly without causing engine racing and the stalling of the engine attributable to an excessive concurrent coupling of the clutches. When the fourth speed is shifted down to the third speed, the third discharge oil control valve $19_3$ interposed in the third discharge oil passage LD3 which is connected to the fourth speed clutch C4 is pressed toward the left-hand opening side by the third speed pressure at the engaged side and opened due to the increased third speed pressure. The control valve $19_3$ thus functions to carry out the fourth to third speed shift down operation smoothly in the same manner as mentioned above. Under certain travelling conditions, for example, when the accelerator is suddenly operated, the speed change characteristics are set so that the speed is changed between the second and fourth speeds skipping over the third speed. To smoothly carry out such a speed changing operation, the first discharge oil control valve $19_1$ provided in the first discharge oil passage LD1 which corresponds to the second speed hydraulic clutch C2 is adapted to be pressed toward the right-hand opening side by the third speed pressure and fourth speed pressure as known from Japanese Patent Laid-open No. 84450/1986, in such a manner that the control valve $19_1$ can deal with both a second to third speed increasing action and a second to fourth speed increasing action. The control valve $19_1$ is also adapted to be pressed toward the left-hand closing side by the hydraulic pressure (which will hereinafter be referred to as second speed pressure) from the second speed hydraulic clutch C2 and opened when a difference between the pressure at the disengaging side and that at the engaging side has become not more than a predetermined level due to the decrease of the second speed pressure at the disengaging side and the increase of the third and fourth speed pressures at the engaging side during a change of the second speed to the third speed and a change of the second speed to the fourth speed. Such a differential pressure-responding type discharge oil control valve is known from Japanese Patent Laid-open No. 82051/1986.

The fourth discharge oil control valve $19_4$, which is provided in the No. 4 discharge oil passage LD4 communicated with the third speed hydraulic clutch C3 when the third speed is shifted down to the second speed, is adapted to be pressed toward the left-hand opening side by the second speed pressure at the engaging side. In order that the control valve $19_4$ can also deal with a speed change from the fourth speed to the second speed, the third discharge oil passage LD3 communicated with the fourth speed hydraulic clutch C4 is communicated with a common inlet port $19_4a$ of the control valve $19_4$ through a branch passage LD3a so that the control valve $19_4$ is provided in the third discharge oil passage LD3 in parallel with the third discharge oil control valve $19_3$, whereby the fourth speed pressure at the disengaging side decreases speedily due to the increase of the second speed pressure at the engaging side even when the fourth speed is shifted down to the second speed. Here in order to prevent it from happening that, when the third speed is shifted down to the second speed, the oil in the third speed hydraulic clutch C3 may be caused to be discharged from an orifice $20_3$ via said inlet port $19_4a$ from the fourth discharge oil. passage LD4, and the third discharge oil passage LD3 before the fourth discharge oil control valve $19_4$ is opened and as a result, a pressure of the third speed pressure may become larger than the pressure decrease characteristic governed by an orifice $20_4$ in the fourth discharge oil passage LD4, a check valve $21_1$ for checking a back flow of the oil from the fourth discharge oil passage LD4 is interposed in the branch passage LD3a and a check valve $21_2$ for checking a back flow of the oil from the third discharge oil passage LD3 is likewise interposed in the fourth discharge oil passage LD4.

It is possible to form the third discharge oil control valve $19_3$ so that is it pressed in the opening direction also by the second speed pressure in addition to the third speed pressure, and thereby deal with an action of shifting the fourth speed down to the second speed. In this case, it is necessary to form both an oil chamber for the third speed pressure and an oil chamber for the second speed pressure in the control valve $19_3$, so that the dimensions of the valve increase as those of the first discharge oil control valve $19_1$. This would make it difficult to install the valve in the valve block of limited dimensions contained in the transmission case. In contrast to the above, the foregoing fourth discharge oil control valve $19_4$ is advantageous in that it can be made as compact as a control valve designed of exclusively for shift down from third speed to second speed and yet concurrently deal with shift down from fourth speed to second speed.

In case of a five forward speed type transmission, the control valve $19_4$ can be so formed by connecting a discharge oil passage for the fifth speed hydraulic clutch to the inlet port $19_4a$ of the control valve $19_4$, as to be able to deal with an action of shifting the fifth speed down to the second speed.

A speed reducing operation in the region of low degree of opening of the throttle can be carried out more smoothly if the pressure in the clutch at the disengaging side is rapidly reduced. Accordingly as known from Japanese Patent Laid-open No. 127956/1986, a fifth discharge oil control valve $19_5$, which is adapted to be opened with a low degree of opening of the throttle, is provided in the third discharge oil control passage LD3 in parallel with the third is charge oil control valve $19_3$, and a sixth discharge oil control valve $19_6$, which is adapted to be opened with a low degree of opening of the throttle, in the fourth discharge oil passage LD4 in parallel with the fourth discharge oil control valve $19_4$. The sixth discharge oil control valve $19_6$ is made of plunger pressing the throttle valve 17 and adapted to be moved toward the left-hand closing side by an operator $19_6a$ which is actuated in accordance with the degree of opening of the throttle. The fifth discharge oil control valve $19_5$ is also formed so that it is pressed toward the left-hand closing side by an operator $19_5a$ which is actuated in accordance with the degree of opening of the throttle. Thus, when the degree of opening of the throttle is low, these control valves $19_5$, $19_6$ are returned to the right hand opening positions, and the third speed pressure and fourth speed pressure decrease speedily by the discharge oil flowing through these valves $19_5$, $19_6$ when the speed is reduced from the third speed to the second speed, from the fourth speed to the third speed, and from the fourth speed to the second speed. The fifth discharge oil control valve $19_5$ is provided at the right end outer circumferential portion thereof with a small-diameter stepped portion $19_5b$, through which the third discharge oil passage LD3 is communicated with a right-hand atmospheric air communicating port when the degree of opening of the throttle is high, to speed up the reduction of the fourth speed pressure during the reduction of the speed from the fourth speed to a lower speed.

In general, the speed change characteristics are set so that, as degree of opening of the throttle increases, the speed changing is done in the higher vehicle speed region. In such a case, the quantity of variations of the number of revolutions per minute of the engine before and after the speed changing operation increases as the vehicle speed becomes higher. Therefore, when the speed is shifted down while a high degree of opening of the throttle, the pressure in the clutch at the high speed side is reduced early to form a neutral state for a short period of time below low speed travelling condition based on the increase of the pressure in the clutch at the low speed side has been established. In this neutral state, the engine should be raced to increase the engine revolution somewhat so that a difference between the revolutions at the input side of the low speed hydraulic clutch and those at the output side thereof decreases to have this clutch engaged smoothly. This enables the speed reduction to be carried out smoothly.

When the third speed has been shifted down to the first speed, the second discharge oil control valve $19_2$, which is interposed in the second discharge oil passage LD2 communicating with the third speed hydraulic clutch C3, is not opened. If the valve $19_2$ is left as it is, the discharging of the oil is done only from the orifice $20_2$ and the reduction of the third speed pressure delays. Consequently, it takes much time to establish the first speed transmission train G1 when the kick-down speed changing, in which the accelerator pedal is stepped to shift the third speed down to the first speed, is done, and the acceleration decreases. In order to prevent this inconvenience, the second discharge oil passage LD2 is constructed such that it may become communicated with an oil discharge port $10_1g$ through the annular recess $10_1f$ formed in the same valve $10_1$ when the first shift valve $10_1$ is in the first speed position. As a result, the oil in the third speed hydraulic clutch C3 is discharged from the oil discharge port $10_1g$ without throttle resistance when such kick-down speed changing is done, so that the first-speed transmission train G1 can be established without a time lag. The first speed hydraulic clutch C1 is constantly engaged in the D position of the manual valve 9, and the first speed transmission train G1 is established when the third speed hydraulic clutch C1 is disengaged.

Figure 7:
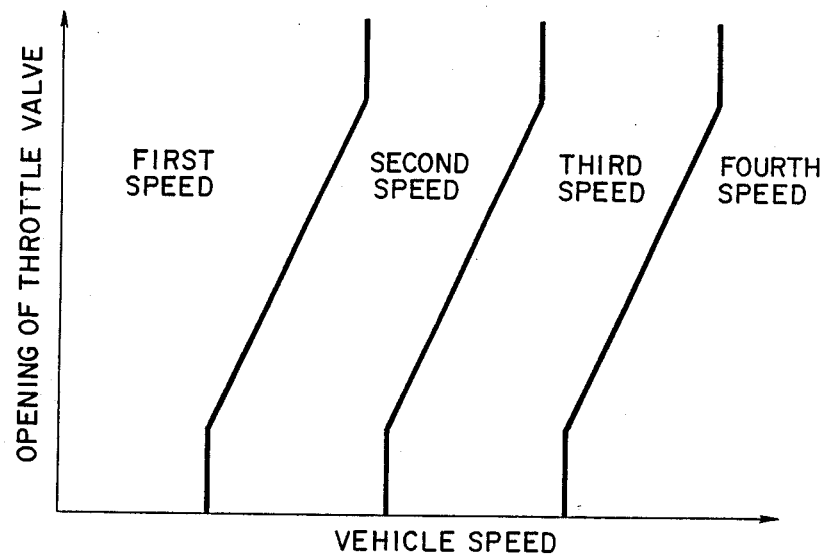
FIG. 7 is a diagram of the speed change characteristics in an S position in the manual valve.

The above is a description of the construction of the oil passages formed when the manual valve 9 is in the D position. When the manual valve 9 is in the S position, the oil passages are also formed in the same manner as in the case where the manual valve 9 is in the D position. In this case, the speed change characteristics stored in the electronic control circuit 16, which is adapted to open and close the first and second open-air valves $15_1$, $15_2$ are changed to carry out a speed change automatically between the first to fourth speeds with the speed change characteristics shown in, for example, FIG. 7. The speed change characteristics shown in FIG. 7 are set so that the speed changing is done at the higher speed side as compared with the speed changing done in accordance with the speed change characteristics shown in FIG. 6. Namely, the speed change characteristics shown in FIG. 7 are set so that they are suitable for the sporty travelling and mountain travelling.

In the D position, the No. 7 and No. 8 oil passages L7, L8 are communicated with each other through the groove 9b in the manual valve 9, while in the S position, they are communicated with each other through the annular groove 9d in the same valve 9.

In the 2 position of the manual valve 9, the No. 14 oil passage L14 communicated with the No. 1 oil passage L1 through the groove 9e in the valve 9 is communicated with the No. 8 oil passage L8 through the annular groove 9d in the valve 9, and the line pressure is inputted into the second shift valve $10_2$ without passing through the first shift valve $10_1$. In the 2 position, both the first and second open-air valves $15_1$, $15_2$ are opened, and the second shift valve $10_2$ is in the right-hand second speed position. The No. 8 oil passage L8 is communicated with the No. 9 oil passage L9 and the oil is supplied to the second speed hydraulic clutch C2, so that the second speed transmission train G2 is established.

In the 2 position, the second oil passage L2 is communicated with an oil discharge port 9f, which consists of an axial bore formed in the manual valve 9, through a groove 9g in the same valve 9, and the oil is not supplied to the first speed hydraulic clutch C1. In the D and S positions, No. 15 oil passage L15 communicated with the left end oil chamber $10_2b$ in the second shift valve $10_2$, which has been communicated with the oil discharge port 9f via a groove 9h in the manual valve 9, is communicated with the No. 6 oil passage L6 through an annular groove 9i in the manual valve 9, so that hydraulic pressure in the oil chamber $10_2b$ becomes ready to be controlled by the second open-air valve $15_2$. The purpose of providing this arrangement is to establish the second speed transmission train G2 by setting the manual valve 9 to the 2 position, and thereby obtain a strong driving force even when an electric current has become unable to be supplied to the solenoids in the first and second open-air valves $15_1$, $15_2$ due to a certain accident to cause these valves $15_1$, $15_2$ to be left closed (fourth speed travelling condition in the D and S positions). Namely, in the 2 position, even when the modulator pressure is inputted into the right end oil chamber $10_2a$ in the second shift valve $10_2$ due to the first open-air valve $15_1$ being closed, the modulator pressure is inputted into the left-hand oil chamber $10_2b$ as well, due to the second open-air valve $15_2$ being closed.

Consequently, the pressing force at the left and right sides based on the modulator pressure is balanced, and the second shift valve $10_2$ is switched over to the right-hand second speed position due to the resilient force of the spring $10_2c$, so that the supplying of the oil to the second speed hydraulic clutch C2 is done.

The purpose of supplying the oil to the second speed hydraulic clutch C2 through the second shift valve $10_2$ in the 2 position is to enable the third speed transmission train G3 to be established depending upon the program in the electronic control circuit even in the 2 position. When the manual valve 9 is switched over to the 2 position while the vehicle travels at a high speed with the valve 9 set to the D and S positions, the overrunning of the engine or a large speed change shock occurs in some cases. In order to prevent this inconvenience, it is necessary to develop a method capable of establishing the third speed transmission train G3 when the vehicle travels at, for example, a vehicle speed not lower than a predetermined level even in the 2 position.

In this case, it is possible to supply the oil to the second shift valve $10_2$ through the first shift valve $10_1$ by communicating the No. 1 oil passage L1 with the No. 2 oil passage L2 in the same manner as in the case where the manual valve is set in the D and S positions. However, if the first speed hydraulic clutch C1 should fail in such a case to cause the oil leak therefrom, the line pressure decreases not only in the D and S positions but also in the 2 position, so that all of the hydraulic clutches become unable to be engaged. As a result, it becomes impossible for the vehicle to travel forward.

In the 2 position in the above-described arrangement, the oil is supplied directly to the second shift valve $10_2$ through the No. 8 oil passage L8 without passing through the first shift valve $10_1$. Accordingly, the vehicle becomes able to travel forward at least in the 2 position, and the above-mentioned inconvenience do not occur.

In the R position of the manual valve 9, the No. 1 oil passage L1 is communicated with a No. 16 oil passage L16 which is communicated with the first shift valve $10_1$ via a groove $9j$ in the manual valve 9. In this case, the first open-air valve $15_1$ is closed, while the second open-air valve $15_2$ is opened (the third speed travelling condition in the D and S positions), with the first shift valve 10 switched over to the left-hand second speed position. Accordingly, the No. 16 oil passage L16 is communicated through the annular groove $10_1h$ in the valve $10_1$ with No. 17 oil passage L17 communicating with the left end oil chamber $11a$ in the servo valve 11. The servo valve 11 is moved to right against the spring $11b$ by the line pressure inputted thereinto through the No. 17 oil passage L17. Consequently, the selector gear 6 joined to the servo valve 11 is switched over to the right-hand reverse position, in which the No. 17 oil passage L17 is communicated with No. 18 oil passage L18, which is communicated with the manual valve 9, through the axial bore $11c$ in the servo valve 11 which is communicated with the oil chamber $17a$.

In the R position of the manual valve 9, the No. 18 oil passage L18 is communicated with the No. 13 passage L13 which is communicated with the fourth speed hydraulic clutch C4 through the groove $9c$, and the supplying of the oil to the fourth speed hydraulic clutch C4 and the switching over of the selector gear 6 to the reverse position are carried out to establish the reverse transmission train GR.

When the servo valve 11 is moved to right to the reverse position, the No. 19 oil passage L19 communicating with the left end oil chamber $10_3b$ in the third shift valve $10_3$ is communicated with the No. 14 oil passage L14 through a groove $11d$ and a spring chamber $11e$ in the servo valve 11, and the oil chamber $10_3b$ is opened to the atmospheric air through a discharge oil port $9k$ which is communicated with the No. 14 oil passage L14 through the annular groove $9a$ in the manual valve 9 when the valve 9 is in the R position. If the servo valve 11 returns late to the advancing position as will be described later, when the manual valve 9 is switched from the R position to the D and S positions, the No. 1 oil passage L1 is communicated with the No. 14 oil passage L14 as mentioned above. As a result, the line pressure is inputted from the No. 14 oil passage L14 into the oil chamber $10_3b$ through the No. 19 oil passage L19 in contrast to the above-mentioned case so that the third shift valve $10_3$ is retained forcibly in the right-hand third speed position. The reasons are as follows.

In a transmission in which a speed change operation is controlled by the electronic control circuit, a normal speed change control operation becomes impossible when there occurs an abnormality in the input signal system for signals from the vehicle speed sensor $16b$ or the like. This can cause, for example, such inconvenience that a shiftdown to a lower speed would take place during a high-speed travelling, thus resulting in an overrunning of the engine to occur. In such a transmission, the self-checking functions for detecting the abnormality of the input signal system are added generally to the electronic control circuit 16 so as to control a speed changing operation so that a maximum speed can be attained when the abnormality has been detected If this is applied to the illustrated embodiment, the fourth speed travelling condition is obtained, i.e., the first and second open-air valves $15_1$, $15_2$ are closed.

Therefore, if the manual valve 9 is switched over from the R position to the D and S positions with an abnormality occurring in the input signal system, the oil continues being supplied to the fourth speed hydraulic clutch C4. In this case, the oil is discharged from the oil chamber $11a$ in the servo valve 11 to an oil discharge port $9l$ through the No. 17 oil passage L17, an annular groove $10_1h$ in the first shift valve $10_1$ being in the second speed position, the No. 16 oil passage L16 and the groove $9j$ in the manual valve 9. When the viscosity of the oil at a low temperature is high, the discharging of the oil from the oil chamber $11a$ i.e. the movement of the servo valve 11 to the left-hand advancing position is delayed so that the selector gear 6 still remains in the reverse position in some cases even after the manual valve has been switched over to the D and S positions. This combined with the supplying of the oil to the fourth speed hydraulic clutch C4 keeps the reverse transmission train GR established. When the manual valve 9 is switched over to the D and S positions, the oil is supplied to the first speed hydraulic clutch C1 as well, so that the reverse transmission train system GR and first speed driving system G1 are established simultaneously. This causes the clutch discs in the first and the fourth speed hydraulic clutches C1, C4 to be burnt and worn early.

However, if the movement of the servo valve 11 in the above arrangement to the advancing position is delayed, the line pressure is inputted into the left end oil chamber $10_3b$ in the third shift valve $10_3$ through the No. 19 oil passage L19. Accordingly, even when the modulator pressure is inputted into the right end oil chamber $10_3a$ in the third shift valve $10_3$ owing to the closing of the second open-air valve $15_2$, the rightward pressing force based on the line pressure and the resilient force of the spring $10_3c$ overcomes the leftward pressing force based on the modulator pressure, so that the third shift valve $20_3$ is held in the right-hand third speed position with the discharging of the oil from the fourth speed hydraulic clutch C4 and the supplying of the oil to the third speed hydraulic clutch C3 carried out properly. Consequently, the third speed transmission train G3 is established, and the above-mentioned inconveniences do not occur.

The purpose of supplying the oil to the servo valve 11 through the No. 16 oil passage L16, first shift valve $10_1$ and a No. 17 oil passage L17 with the manual valve 9 set to the R position is to switch the first shift valve $10_1$ to the first speed position when the vehicle travels forward at a vehicle speed not lower than a predetermined level, and thereby prevent the oil passages L16, L17 from being communicated with each other, and the reverse transmission train GR from being established. In this case, if the vehicle speed is not lower than a predetermined level when the manual valve switched from the advancing positions D, S, 2 to the N position, the first shift valve $10_1$ is switched in advance to the first speed position so that the establishment of the reverse transmission train in the R position can be reliably prevented.

In the N position in the manual valve 9, the oil is supplied from the No. 1 oil passage L1 to the modulator valve 13 only, and not at all to the oil passages on the downstream side of the manual valve 9. The same applies to the case where the manual valve 9 is in the P position.

The first and second open-air valves $15_1$, $15_2$ consist of normally-closed type valves. If these valves $15_1$, $15_2$ consist of normally-open type valves, it is necessary that a large exciting force be generated to enable the valves $15_1$, $15_2$ to be closed against the springs, which urge the same valves in the opening direction, and the modulator pressure by supplying an electric current to the solenoid 15a. This causes the dimensions of the valves $15_1$, $15_2$ to increase. If normally-closed type valves are employed, they can be opened, when an electric current is supplied to the solenoid 15a by a comparatively small exciting force which corresponds to a difference obtained by subtracting the pressing force based on the modulator pressure from the force of the springs which urge these valves $15_1$, $15_2$ in the closing direction. This enables these valves to be miniaturized. Moreover, while the cruising is done at the fourth speed with the two valves $15_1$, $15_2$ closed, the supplying of an electric current to the same valves can be interrupted, so that the power consumption can be reduced.

The above are the explanations about the controlling of speed changing operations in various positions of the manual valve 9. A clutch 22 contained in the hydraulic torque converter 3 will now be described.

Referring to FIG. 2, the clutch 22 mechanically connects together, for example, an input case 3a at the input side of the hydraulic torque converter 3, and, for example, a turbine wheel 3b at the output side thereof. The clutch 22 is provided with a clutch plate 22a in a clearance between the input case 3a and turbine wheel 3b. The clutch plate 22a is connected to the turbine wheel 3c via a damper spring 22b, in such a manner that the clutch plate 22a can be axially moved. The inner space of the torque converter 3 is divided by the clutch plate 22a into a wheel housing chamber 23 and a back pressure chamber 24 at the side of the input case 3a so that the torque converter 3 can be switched by a control valve 25, which will be described later, to a clutch-disengaged state in which the oil is supplied from the back pressure chamber 24 to the inner space, and a clutch-engaged state in which the oil is supplied from the housing chamber 23 thereto. In the clutch-engaged state, the clutch plate 22a is frictionally engaged with the input case 3a by an engaging force corresponding to a difference between the internal pressure in the housing chamber 23 (which will hereinafter be referred to as Pa) and that in the back pressure chamber 24 (which will hereinafter be referred to as Pb).

The control valve 25 can be switched to a right-hand disengaging position (position shown in the drawing) in which the oil is supplied to the back pressure chamber 24 with No. 20 oil passage L20, which is communicated with the regulator valve 25, joined to No. 21 oil passage L21, which is communicated with the back pressure chamber 24, and a left-hand engaging position in which the oil is supplied to the housing chamber 23 with the No. 20 oil passage L20 joined to No. 22 oil passage L22 which is communicated with the housing chamber 23. The modulator pressure (which will hereinafter be referred to as Pm) is inputted into the right end oil chamber 25a in the control valve 25 through the No. 4 oil passage L4. No. 23 oil passage L23 communicating with the No. 4 oil passage L4 through an orifice $26_1$ is communicated with the left end oil chamber 25b in the control valve 25, and a third electromagnetic normally-closed open-air valve $15_3$ is connected to the No. 23 oil passage L23. When the valve $15_3$ is opened, the control valve 25 is switched over to the engaging position against the spring 25c due to the difference between the pressures in the two oil chambers 25a, 25b so that the clutch 22 is engaged.

Referring to the drawing, a first relief valve 27 consisting of a check valve is interposed in the fifth discharge oil passage LD5 communicating with the housing chamber 23 so as to regulate Pa to a comparatively high predetermined level. An oil cooler 28, an oil reservoir 29, and relief valves $30_1$, $30_2$ are provided so as to prevent the pressures applied to the oil cooler 28 and portions to be lubricated from increasing excessively.

The engaged state of the clutch 22 is switched to a directly-engaged state in which the input and output sides of the clutch 22 are connected directly and a slipping state in which the slipping of the input and output sides is allowed due to the variations in the engaging force which are based on the increase and decrease of the difference between the pressures Pa, Pb. The control apparatus is formed as follows so as to control this differential pressure in such a manner that the differential pressure varies in accordance with the travelling condition of the vehicle.

No. 24 oil passage L24 communicating with the No. 21 oil passage L21 in the engaging position of the control valve 25, and No. 25 oil passage L25 branching off from the No. 22 oil passage L22 are joined to each other via a second relief valve 31 to form a communication passage by which the back pressure chamber 24 and the housing chamber 23 are communicated with each other. The sixth discharge oil passage LD6 which is parallel to the first relief valve 27 is communicated with the fifth discharge oil passage LD5, and a switch valve 32 is provided in the discharge oil passage LD6. This switch valve 32 is adapted to be pressed toward the left-hand closing side by a throttle pressure (which will hereinafter be referred to as $P\theta$) inputted from the throttle valve 17 into a right end oil chamber 32a, and toward the right-hand opening side by Pm inputted into a left end oil chamber 32b through No. 26 oil passage L26, which is connected to the No. 4 oil passage L4 via an orifice $26_2$, and a spring 32c. A fourth electromagnetic normally-closed open-air valve $15_4$ is connected to the No. 26 oil passage L26. Thus, only when the fourth valve $15_4$ is opened with $P\theta$ not lower than a predetermined level Ps (with the degree of opening of the throttle not lower than a predetermined level $\theta s$), the switch valve 32 is closed. When Pm is being inputted into the left end oil chamber 32b with the fourth open-air valve $15_4$ closed, the switch valve 32 is not closed even if the throttle is fully opened.

The second relief valve 31 is formed so as to serve as a differential pressure-responding valve which is pressed toward the right-hand opening side by a hydraulic pressure Pa inputted thereinto through No. 27 oil passage L27, which is communicated with the sixth discharge oil passage LD6 when the switch valve 32 is opened, and toward the left-hand closing side by a hydraulic pressure Pb inputted into the valve 31 through the pilot oil passage L24a communicating with the No. 24 oil passage L24. The second relief valve 31 is pressed toward a closing side by $P\theta$ from the throttle valve 17, and toward an opening side by Pm inputted thereinto through the No. 26 oil passage L26, and a spring 31a. In the following equations, S1 equals a pressure-receiving area for Pa, Pb in the second relief valve 31, S2 is a pressure-receiving area for $P\theta$, Pm, and F is the force of the spring 31a. The force applied to the second relief valve 31 is expressed by the equation, $$PaS1 + PmS2 + F = PbS1 + P\theta S2$$

Therefore, the following relational expression is established:

$$Pa - Pb = \frac{S2}{S1}P\theta - \frac{F}{S1} - \frac{S2}{S1}Pm \quad (1)$$

The third and fourth open-air valves $15_3$, $15_4$ are opened and closed by the electronic control circuit 16 in the same manner as the speed change-controlling first and second open-air valves $15_1$, $15_2$.

Figure 8:
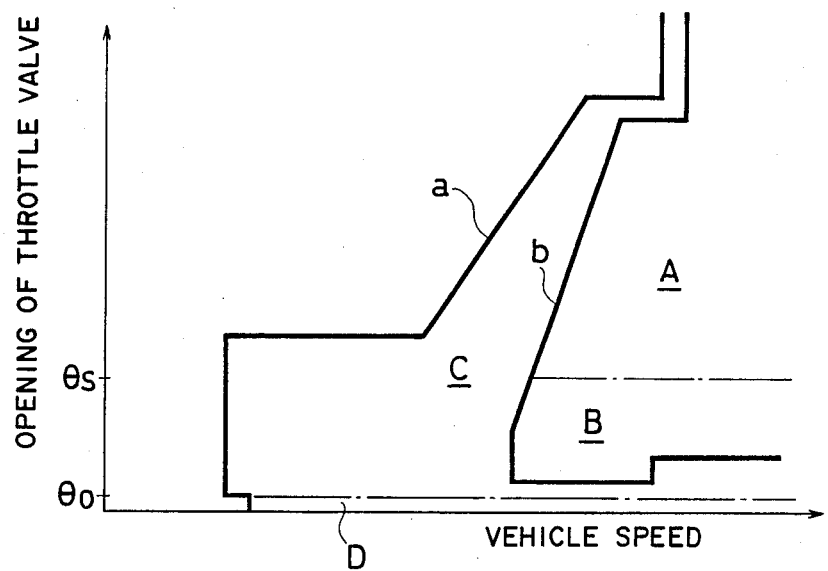
FIG. 8 is a diagram of the operational characteristics of a clutch for a torque converter.
Figure 9:
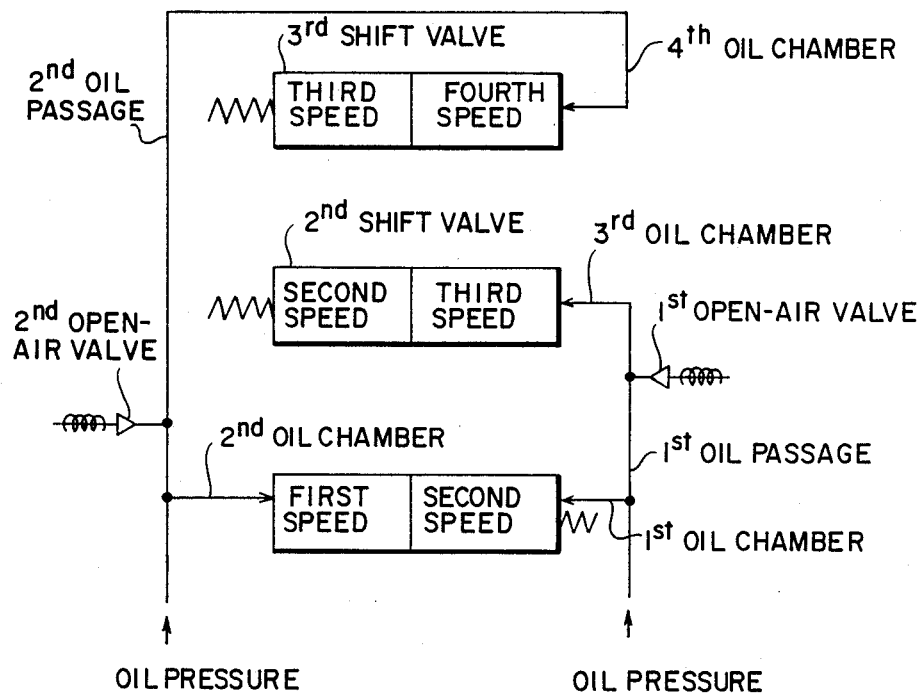
FIG. 9 is a schematic diagram showing the concept of the present invention.

FIG. 8 shows the operational characteristics of the clutch 22. The third open-air valve $15_3$ is opened in the region which is on the higher speed side of a line a in the drawing, and the control valve 25 is switched over to the engaging position as previously mentioned, to engage the clutch 22. The fourth open-air valve $15_4$ is opened in the region encompassed by a line b in FIG. 8.

The conditions for closing the switch valve 32 are satisfied only in the region A in FIG. 8, which is encompassed by the line b, and which has a degree of opening of the throttle higher than $\theta S$. The valve 32 is kept open in a region B encompassed by a line b which has a degree of opening of the throttle not higher than $\theta S$ and a region C which is between the lines a, b. Consequently, in these regions B and C, the Pa becomes comparatively low due to the discharging of the oil which is done through the No. 6 discharge oil passage LD6, the supplying of the oil into the back pressure chamber 24 is done through the second relief valve 31, and the difference between Pa, Pb increases as the degree of opening of the throttle increases, in accordance with the above equation (1). The clutch engaging force increases in accordance with the output torque of the engine which increases due to the increased degree of opening of the throttle, so that the clutch 22 operates in a slipping state to have the speed ratio of the torque converter 3 kept constant irrespective of the increase and decrease in the output torque. Since the fourth open-air valve $15_4$ is closed in the C region, Pm is inputted into the second relief valve 31. However, in the B region, the fourth open-air valve $15_4$ is open, so that the inputting of Pm is interrupted, whereby the difference between Pa, Pb increases to such an extent that corresponds to the member Pm of the equation (1). Thus, in the region C, the speed ratio of the torque converter 3 is maintained at around 0.92–0.93, and the torque variations which are apt to increase in the region of a low vehicle speed and the region of a low degree of opening of the throttle can be suppressed effectively by the slipping of the clutch 22. In the region B in which the degree of opening of the throttle is not extremely low, and in which the torque variations pose substantially no problems, the engaging force large enough to barely maintain the speed ratio at 1.0 can be obtained. This can prevent an increase in the fuel consumption ascribed to the unnecessarily large amount of slipping of the clutch 22.

When the deceleration travelling is done with the degree of opening of the throttle set to an extremely low level of not higher than $\theta_0$ at which the throttle is almost fully closed, the variations of the engine torque are negligible. Accordingly, in a region D, which is the portion of the region between the lines a, b in which the degree of opening of the throttle is not higher than $\theta_0$, the fourth open-air valve $15_4$ is duty-controlled by feeding back the speed ratio of the torque converter 3, in such a manner that the valve-opening time within a unit time varies correspondingly to a difference between an actual speed ratio and a target speed ratio to maintain the speed ratio at around 1.02–1.03. Thus, the effect of engine braking can be maintained in excellent condition, and the occurrence of vibrations of the vehicle body during the engine braking can be prevented.

In the region A, the switch valve 32 is closed, and the discharging of the oil through the sixth discharge oil passage LD6 is interrupted. Pa is maintained at a comparatively high level set by the first relief valve 27. The inputting of Pa into the second relief valve 31 through the No. 27 oil passage L27, and Pm thereinto through the No. 26 oil passage L26 are interrupted by the opening of the fourth open-air valve $15_4$. The second relief valve 31 is pressed by $P\theta$ (higher than Ps) to the closing position against the spring 31a to interrupt the supplying of the oil to the back pressure chamber 24, so that the value of Pb becomes close to that of the atmospheric air. Consequently, the difference between Pa, Pb becomes large, and the clutch 22 is operated in a directly-engaged state. Referring to the drawings, an oil filter 33 is provided on the upstream side of the first to fourth open-air valves $15_1$, $15_2$, $15_3$, $15_4$, modulator valve 13 and throttle valve 17. A driving circuit 15b is provided for applying an electric current to the solenoids 15a for the open-air valves $15_1$, $15_2$, $15_3$, $15_4$ in accordance with a command signal from the electric control circuit 16.

A sensor 16d is provided for inputting to the control circuit 16 the number of revolutions per minute of the engine. The control circuit 16 is also adapted to determine the speed ratio of the hydraulic torque converter 3 on the basis of the number of revolutions per minute, which is calculated on the basis of the vehicle speed and gear ratio of the transmission train now established, of the output shaft of the converter 3 and the number of revolutions per minute of the engine.

According to the present invention described above, the first to third shift valves are switched by only two electromagnetic valves i.e., the first and second open-air valves to obtain the first to fourth speeds. Therefore, the present invention enables the number of the shift valves and electromagnetic valves to be reduced to the lowest possible level, so that the manufacturing cost and power consumption can be reduced. Moreover, this improved control apparatus can be obtained by modifying only a small number of portions of a conventional hydraulic circuit using first to third shift valves.

Therefore, the control apparatus according to the present invention can be advantageously manufactured.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission a first-speed hydraulic clutch, a second-speed hydraulic clutch, a third-speed hydraulic clutch, and a fourth-speed hydraulic clutch which respectively establish a first-speed transmission train, a second-speed transmission train, a third-speed transmission train, and a fourth-speed transmission train for forward drive, having a hydraulic circuit through which oil is fed to said clutches and discharged from said clutches and which is provided with a first shift valve connected through a manual valve to a hydraulic power source, a second shift valve located downstream of the first shift valve and a third shift valve located downstream of the second shift valve, said first shift valve being switchable to first-speed position at which the supplying of the oil to the first-speed hydraulic clutch and the discharging of the oil from the second-speed hydraulic clutch are carried out and to second-speed position at which the supplying of the oil to the second shift valve is carried out, said second shift valve being switchable to second-speed position at which the supplying to the second-speed hydraulic clutch of the oil supplied from said first shift valve and the discharging of tee oil from the third-speed hydraulic clutch are carried out and to third-speed position at which the discharging of the oil from the second hydraulic clutch and the supplying to the third shift valve of the oil supplied from said second shift valve are carried out, and said third shift valve being switchable to third-speed position at which the supplying to the third-speed hydraulic clutch of the oil supplied from said second shift valve and the discharging of the oil from the fourth-speed hydraulic clutch are carried out and to fourth-speed position at which the discharging of the oil from the third-speed hydraulic clutch and the supplying of the oil to the fourth-speed hydraulic clutch are carried out, characterized in that said first shift valve is urged to the second-speed position, said second shift valve to the second-speed position and said third shift valve to the third-speed position by respective springs, and that there are provided a first oil chamber giving said first shift valve a pressing force acting towards the second-speed position, a second oil chamber giving said first shift valve a pressing force acting towards the first speed position, a third oil chamber giving said second shift valve a pressing force acting towards the third-speed position, and a fourth oil chamber giving said third shift valve a pressing force acting towards the fourth-speed position, and there are further provided a first electromagnetic open-air valve connected to a first oil passage through which the oil is inputted to the first and the third oil chambers, and a second electromagnetic open-air valve connected to a second oil passage through which the oil is inputted to the second and the fourth oil chambers.

2. A control apparatus for hydraulically operated vehicular transmissions according to claim 1, wherein there is interposed in the first-speed transmission train a one-way clutch which permits an over-revolution at the output side so that the oil may be supplied to the first-speed hydraulic clutch through an oil passage located upstream of the first shift valve connected to the manual valve.

3. A control apparatus for a hydraulically operated vehicular transmission according to claim 1, wherein an oil discharge passage connected to said third-speed hydraulic clutch via said third shift valve is adapted to be open to discharge oil via said first shift valve at said first-speed position of said first shift valve 4. A control apparatus for a hydraulically operated vehicular transmission according to claim 2, wherein an oil discharge passage connected to said third-speed hydraulic clutch via said third shift valve is adapted to be open to discharge oil via said first shift valve at said first-speed position of said first shift valve.

5. A control apparatus for a hydraulically operated vehicular transmission according to claim 1, wherein said first and second open-air valves are normally-closed valves which open only when a solenoid of each is energized.

6. A control apparatus for a hydraulically operated vehicular transmission according to claim 2, wherein said first and second open-air valves are normally-closed valves which open only when a solenoid of each is energized.

7. A control apparatus for a hydraulically operated vehicular transmission according to claim 3, wherein said first and second open-air valves are normally-closed valves which open only when a solenoid of each is energized.

8. A control apparatus for a hydraulically operated vehicular transmission according to claim 4, wherein said first and second open-air valves are normally-closed valves which open only when a solenoid of each is energized.

* * * * *